United States Patent Office 3,502,423
Patented Mar. 24, 1970

3,502,423
CHLORINATED OR BROMINATED DIAMINO-DI-HYDROXY-ANTHRAQUINONES AND MIXTURES THEREOF
Paul Buecheler, Reinach, Basel-Land, Switzerland, assignor to Sandoz Ltd. (also known as Sandoz A.G.), Basel, Switzerland
No Drawing. Filed Mar. 1, 1967, Ser. No. 619,551
Claims priority, application Switzerland, Mar. 4, 1966, 3,152/66
Int. Cl. C09b 1/56; D06p 3/54
U.S. Cl. 8—25                     8 Claims

ABSTRACT OF THE DISCLOSURE

Disperse dyestuffs of the diamino-dihydroxyanthraquinone-series in which the molecules are substituted, on the average, by 1.2 to 2 mercapto groups and 1.5 to 2 chlorine or bromine atoms. Polyester, polyamide and cellulose triacetate fibers are a dye with mixture of these dyes or with a single dye in the dispersed dyeing process.

DESCRIPTION

It has been found that valuable disperse dyes of the formula

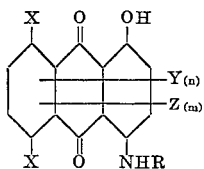

(I)

are obtained when a compound of the formula

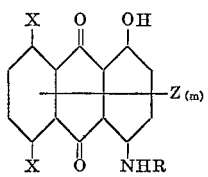

(II)

which is free from carboxylic acid and sulphonic acid groups, is chlorinated or brominated.

In these formulae R in both instances stands for a hydrogen atom or an optionally substituted hydrocarbon radical, one X for a hydroxyl group and the other X for a radical of the formula—NHR, Y for a chlorine or bromine atom, Z for a radical of the formula —S—R', R' for a hydrogen atom or an optionally substituted hydrocarbon radical, $n$ for 1.5 to 2 and $m$ for 1.2 to 2.

Examples of suitable hydrocarbon radicals R and R', which may be substituted, are linear or branched alkyl radicals which have 1 to 8 or, preferably, 1 to 5 carbon atoms and may be substituted, cycloalkyl radicals which have 5 to 8 carbon atoms and may be substituted, e.g., by alkyl with 1 to 3 carbon atoms, and phenyl radicals which may be substituted, e.g., by linear or branched, saturated or unsaturated alkyl or alkoxy radicals, halogen atoms, in particular chlorine or bromine atoms, or hydroxyl, amino or nitro groups. The alkyl or alkoxy radicals may likewise be substituted, for example by cyano or hydroxyl groups.

Preferred compounds of Formula I correspond to the formula

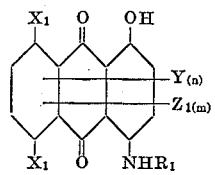

(III)

where Y, $n$ and $m$ have one of the aforestated meanings, $R_1$ stands for a lower alkyl radical which may be substituted by a cyano or hydroxyl group or a lower alkoxycarbonyl or alkylaminocarbonyl group or a dimethylamino-propylaminocarbonyl group, the one $X_1$ for a hydroxyl group and the other $X_1$ for a radical of the formula —$NH_2$ or —$NHR_1$, $Z_1$ for a radical of the formula —S—$R_2$, and $R_2$ for a hydrogen atom or a lower alkyl radical which may be substituted by a cyano or hydroxyl group or by a lower alkoxy, alkoxycarbonyl or alkylaminocarbonyl group.

The groups and radicals that are designated "lower" contain 1, 2, 3 or 4 carbon atoms.

The dyes of Formula III are produced by chlorination or bromination of a compound of the formula

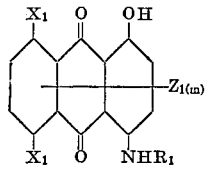

(IV)

Further preferred compounds conform to the formula

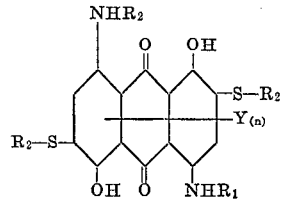

(V)

where the substituents $R_1$, $R_2$ and Y and the symbol $n$ have one of the meanings assigned to them in the foregoing and $R_3$ represents a hydrogen atom or has the same meaning as $R_1$.

The dyes of Formula V are obtained by the chlorination or bromination of a compound of the formula

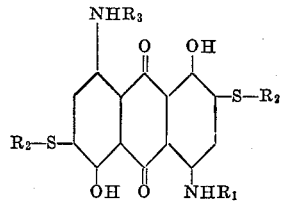

(VI)

The starting compounds of Formula II are halogenated by treatment with halogenating agents, such as chlorine, bromine or sulphuryl chloride, in a suitable medium, for example sulphuric acid or fuming sulphuric acid or an organic solvent, such as halogenobenzene or nitrobenzene. In certain circumstances it may be desirable to include in the reaction mixture boric acid or paraformaldehyde and one of the reaction accelerants normally used for halogenation, for example iodine. In sulphuric acid medium the halogenation reaction is carried out at 20° to 100° C. or, preferably, at 30° to 50° C. and in nitrobenzene, at about 100° to 180° C.

The starting compounds of Formula II can be obtained by reacting 1 mole of a compound of the formula

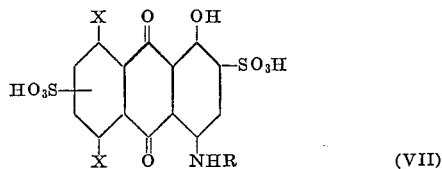

(VII)

with at least 2 moles of hydrogen sulphide or of one of its derivatives, preferably a mercaptan. This reaction can be effected in aqueous solution at 90° to 105° C. or in an organic medium at 120° to 190° C. in the presence of a basic condensing agent.

The disperse dyes thus obtained are converted into dyeing preparations in the normal way by grinding with wetting, emulsifying or dispersing agents until the size of the dye particles is about 0.01 to 10 microns, with the bulk of the particles in the range of 0.1 to 5 microns. The resulting dye preparations can be used for dyeing, padding or printing organic synthetic or regenerated fibers of hydrophobic character and of yarns, woven fabrics, knit goods and other textiles made of such fibers. Particularly good results are obtained in the dyeing of linear aromatic polyester fibers, e.g., those produced with terephthalic acid and ethylene glycol, (polyethylene terephthalate). The dyes are also suitable for application to polyamide fibers, e.g., the polycondensates or polymers of adipic acid and hexamethylene diamine, $\omega$-aminoundecanoic acid or $\epsilon$-caprolactam, and to cellulose triacetate. Polyamide and cellulose triacetate fibers can be dyed from aqueous dispersion at a long or short liquor ratio and they can be pad dyed or printed with the dyes. The auxiliary products generally used for the dyeing, padding or printing of textile materials are of service here; thus, wetting, emulsifying, dispersing and thickening agents and the usual carriers can be employed.

The dye or dyes applied by a dyeing, padding or printing method is fixed on and in the fiber by heat treatment. This treatment can be carried out in the dyebath at 100–145° C., or subsequent to application by treatment in a dry air or steam atmosphere. For the latter method of fixation the temperature is generally about 100° to 140° C. when water vapour is used, or 150° to 235° C. in dry air. The dyeings obtained are of blue to greenish blue shade and have very good fastness to light, rubbing, chlorine, peroxide, hypochlorite, cross dyeing, gas fume fading and dry cleaning, together with particularly good fastness to pleating, sublimation and thermofixation and to wet tests such as washing, water spotting, steaming, chlorinated swimming pool water, sea water and perspiration.

In comparison with the similar dyes disclosed in French patent specification No. 1,330,396, the disperse dyes produced in accordance with this invention have superior light fastness, and their affinity, especially for polyester fibers, is at least equal to that of the dyes of the aforesaid patent.

In the examples the parts and percentages are by weight and the temperatures in degrees centigrade.

EXAMPLE 1

A mixture of 8 parts of 1,5-dihydroxy-2,6-di-(2'-hydroxyethylmercapto) - 4 - amino-8-methylamino-anthraquinone, 10 parts of 1,5-dihydroxy-2,6-di-(2'-hydroxyethylmercapto)-4,8-di-(methylamino)-anthraquinone, 44 parts of 93% sulphuric acid and 10 parts of boric acid is prepared at 40° with stirring. Over 1 hour 15 parts of bromine are dropped in at 36–38° and the reaction mixture is stirred for a further 18 hours at 36–40°, after which it is run into 500 parts of water with stirring. The precipitate is suctioned off and washed with water until the filtrate is of neutral reaction. The filter cake is stirred into 500 parts of water containing 5 parts of sodium carbonate and the suspension raised to 95°, following which the product is filtered off, washed with water until the filtrate runs neutral and vacuum dried at 60°. The dye is obtained in a yield of 23 parts as a dark blue powder which dissolves in chlorobenzene with a green blue colour; it contains 26.3% bromine.

DYEING EXAMPLE

A mixture of 8 parts of the dye produced as described in the preceding example, 12 parts of sodium dinaphthylmethane disulphonate and 180 parts of water is ground to a fine dispersion in a ball mill. 9 parts of the dispersion are run into 3000 parts of water containing 20 parts of 2-hydroxy-1,1'diphenyl, and 100 parts of a fabric of polyester fiber are entered into this dyebath at 40°. The bath is brought to the boil in 20 minutes and the fabric dyed for 1 hour at 100°, then removed, rinsed with water and dried. The dyeing on the polyester fabric is of bright green-blue shade and has very good fastness to light, washing, pleating and thermofixation.

Method of preparation of a starting compound of Formula II 50 parts of a mixture of 50% sodium-1-methylamino-4,8 - dihydroxy - 5-amino-anthraquinone-3,7-disulphonate and 50% sodium - 1,5-bis-(methylamino)-4,8-dihydroxy-anthraquinone-3,7-disulphonate are reacted with 100 parts of 60% sodium sulphide in 400 parts of boiling water. On completion of the reaction 200 parts of water are added for dilution, followed by 100 parts of sodium chloride. The precipitated product is filtered off, washed with 10% sodium chloride solution until the filtrate runs neutral and then with water, and finally dried.

EXAMPLE 2

A mixture of 15 parts of a mixture of 1,8-dihydroxy-2,7 - di(2' - hydroxyethylmercapto) - 4-amino-5-methylamino anthraquinone and 1,8 - dihydroxy - 2,7-di-(2'-hydroxyethylmercapto) - 4,5 - di - (methylamino) - anthraquinone, 10 parts of boric acid and 150 parts of 93% sulphuric acid is prepared at 40° with stirring. In the course of 1 hour 18 parts of bromine are dropped in at 35° and the reaction mixture is stirred for a further 18 hours at 36–40°. It is then stirred into 1000 parts of water and the temperature raised to 90°. The precipitated product is suctioned off, washed with water till of neutral reaction, stirred into 500 parts of water containing 5 parts of sodium carbonate, heated at 95°, filtered off, washed with water until the filtrate runs neutral, and vacuum dried at 60°. 16 parts of a dark blue powder are obtained which dissolves in chlorobenzene with a greenish blue colour. The dye contains 22% bromine.

EXAMPLE 3

11 parts of a mixture of 1,5-dihydroxy-2,6-di-(ethylmercapto)-4-amino - 8 - methylaminoanthraquinone and 1,5-dihydroxy-2,6-di-(ethylmercapto) - 4,8 - di-(methylamino)-antraquinone and 6 parts of boric acid are stirred into 95 parts of 92% sulphuric acid. Over 1 hour 12 parts of bromine are dropped in at 40° and the reaction mixture is stirred for a further 16 hours at 35–40°. It is then run into 600 parts of water and the temperature raised to 95°. The precipitate is suctioned off, washed neutral with water and stirred immediately into a solution of 500 parts of water and 5 parts of sodium carbonate. The temperature is again increased to 95°, the product filtered off, washed in water until the filtrate runs neutral and dried. 12 parts of a dark blue powder are obtained which dissolves in chlorobenzene to give greenish blue solutions. The dye contains 18% bromine.

EXAMPLE 4

10 parts of a mixture of 1,5-dihydroxy-2,6-di-(2'-hydroxyethylmercapto)-4,8 - di - (mehylamino) - anthraquinone and 1,5 - dihydroxy-2,6-di-(2'-hydroxyethylmercapto)-4-amino-8-methylaminoanthraquinone, 10 parts of boric acid and 0.1 part of iodine are stirred into 154 parts of 92% sulphuric acid at 40°. At this temperature a moderately strong jet of chlorine is conducted through the reaction mixture until chromatographic examination of a sample shows that no further starting compound is present. The mixture is then stirred into 700 parts of water, the temperature increased to 95° and the precipitate suctioned off and washed with water until neutral. It is stirred immediately into 500 parts of water containing 5 parts of sodium carbonate, heated to 95°, filtered off, washed with water until the filtrate runs neutral, and dried. The dye is obtained in a yield of 10 parts as a dark blue powder of 13.5% chlorine content, which dissolves in chlorobenzene with a blue colour.

EXAMPLE 5

15 parts of a mixture of 1,8-dihydroxy-2,7-di-(2'-hydroxyethylmercapto)-4-amino-5 - methylaminoanthraquinone and 1,8-dihydroxy-2,7-di-(2'-hydroxyethylmercapto)-4,5-di-(methylamino) - anthraquinone are stirred into 120 parts of 1,2-dichlorobenzene at 120°. The reaction mixture is allowed to cool to 60°, on which 16 parts of sulphuryl chloride are added over 15 minutes and stirring continued for a further hour at 60°. The 1,2-dichlorobenzene is distilled off with water vapour, and then the precipitate is filtered off, washed with hot water until the filtrate runs neutral and colourless, and finally dried. 16 parts of a dark blue powder are obtained which dissolves in chlorobenzene with a blue colour. This dye contains 13.9% chlorine.

In the following examples details are given of the constitution of further dyes which can be produced by a procedure analogous to those of the preceding examples.

| Example No. | Formula of dye or dye mixture | Percent Halogen | Shade in chlorobenzene |
|---|---|---|---|
| 6 | 60 parts of 1,5-dihydroxy-4,8-bis-(ethylamino)-2,6-bis-(3'-methoxy-propylmercapto)-anthraquinone and 40 parts of 1,5-dihydroxy-4-ethylamino-8-amino-2,6-bis-(3'-methoxypropylmercapto)-anthraquinone. | 25% bromine | Blue. |
| 7 | 1,8-dihydroxy-4-amino-5-(2'-cyanopropylamino)-2,7-bis-(2''-ethoxyethylmercapto)-anthraquinone. | 9% chlorine | Do. |
| 8 | 10 to 40 parts of 1,5-dihydroxy-4-amino-8-(2'-ethoxycarbonyl)-ethylamino-2,6-bis-(4''-hydroxybutylmercapto)-anthraquinone and 90 to 60 parts of 1,5-dihydroxy-4,8-bis-(2'-ethoxycarbonyl-ethylamino)-2,6-bis-(4''-hydroxybutylmercapto)-anthraquinone. | 18% bromine | Do. |
| 9 | 80 parts of 1,8-dihydroxy-4,5-bis-(isopropylamino)-2,7-bis-(cyanomethylmercapto)-anthraquinone and 20 parts of 1,8-dihydroxy-4-amino-5-isopropylamino-2,7-bis-(cyanomethylmercapto)-anthraquinone. | 20% bromine | Do. |
| 10 | 55 parts of 1,5-dihydroxy-4,8-bis-(2'-hydroxyethylamino)-2,6-bis-(methoxycarbonyl-methylmercapto)-anthraquinone and 45 parts of 1,5-dihydroxy-4-amino-8-(2'-hydroxyethylamino)-2,6-bis-(methoxycarbonylmethylmercapto)-anthraqiunone. | 10.5% chlorine | Do. |
| 11 | 1,5-dihydroxy-4,8-bis-(cyclohexylamino)-2,6-bis-(2'-propoxy-ethylmercapto)-anthraquinone. | 17% bromine | Greenblue. |
| 12 | 1,8-dihydroxy-4,5-bis-(methoxypropylamino)-2,7-bis-(2'-methylaminocarbonylethylmercapto)-anthraquinone. | 21% bromine | Do. |
| 13 | 60 parts of 1,5-dihydroxy-4-amino-8-(ethylamino-carbonylmethylamino)-2,6-bis-(3''-butoxypropylmercapto)-anthraquinone and 40 parts of 1,5-dihydroxy-4,8-bis-(ethylaminocarbonylmethylamino)-2,6-bis-(3''-butoxypropylmercapto)-anthraquinone. | 7% chlorine | Blue. |
| 14 | 1,8-dihydroxy-4-amino-5-[2'-(3''-dimethylaminopropylaminocarbonyl)-ethylamino]-2,7-bis-(3'''-hydroxypropylmercapto)-anthraquinone. | 10% chlorine | Do. |
| 15 | 30 parts of 1,5-dihydroxy-4-amino-8-butylamino-2,6-bis-(2'-ethoxycarbonyl-ethylmercapto)-anthraquinone and 30 parts of 1,5-dihydroxy-4,8-bis-(butylamino)-2,6-bis-(2'-ethoxycarbonylethylmercapto)-anthraquinone. | 18% bromine | Do. |
| 16 | 40 to 60 parts of 1,5-dihydroxy-4-amino-8-methylamino-2,6-bis-(2'-hydroxyethylmercapto)-anthraquinone and 60 to 40 parts of 1,5-dihydroxy-4,8-bis-(methylamino)-2-(2'-hydroxyethylmercapto)-anthraquinone. | 26.3% bromine | Greenblue. |
| 17 | 50 to 70 parts of 1,8-dihydroxy-4,5-bis-(2'-n-propoxycarbonylethylamino)-2,6-dimercapto-anthraquinone and 50 to 30 parts of 1,8-dihydroxy-4-amino-5-(2'-n-propoxycarbonylethylamino)-2,6-dimercaptoanthraquinone. | 7% chlorine | Blue. |

Representative dyestuffs are as follows:

The mixture of compounds obtained by bromination of 1,5 - dihydroxy - 2,6 - di - (2' - hydroxyethylmercapto) - 4 - amino - 8 - methylaminoanthraquinone and 1,5 - dihydroxy - 2,6 - di - (2' - hydroxyethylmercapto) - 4,8 - di - (methylamino)-anthraquinone (Example 1).

The mixture of compounds obtained by bromination of 1,8 - dihydroxy - 2,7 - di - (2' - hydroxyethylmercapto) - 4 - amino - 5 - methylaminoanthraquinone and 1,8 - dihydroxy - 2,7 - di - (2' - hydroxyethylmercapto) - 4,5 - di - (methylamino)-anthraquinone (Example 2).

The mixture of compounds obtained by chlorination of 1,5 - dihydroxy - 2,6 - di - (2' - hydroxyethylmercapto) - 4,8-di-(methylamino)-anthraquinone and 1,5-dihydroxy-2,6 - di - (2' - hydroxyethylmercapto) - 4 - amino - 8 - methylaminoanthraquinone (Example 4).

The mixture of compounds obtained by chlorination of 1,8 - dihydroxy - 2,7 - di - (2' - hydroxyethylmercapto) - 4-amino-5-methylaminoanthraquinone and 1,8-dihydroxy-2,7 - di - (2' - hydroxyethylmercapto) - 4,5 - di - (methylamino)-anthraquinone (Example 5).

Having thus disclosed the invention what I claim is:

1. Disperse dyestuff of the formula

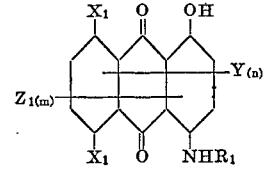

wherein $R_1$ is a member selected from the group consisting of lower alkyl, cyano(lower)alkyl, hydroxy(lower)alkyl, lower alkoxycarbonyl, lower alkylaminocarbonyl and dimethylaminopropylaminocarbonyl;

one $X_1$ is hydroxy;

the other $X_1$ is a member selected from the group consisting of —$NH_2$ and —$NHR_1$;

$Z_1$ is —S—$R_2$;

$R_2$ is a member selected from the group consisting of lower alkyl, cyano(lower)alkyl, hydroxy(lower)alkyl, lower alkoxy(lower)alkyl, lower alkoxycarbonyl(lower)alkyl and lower alkylaminocarbonyl(lower)alkyl;

Y is a member selected from the group consisting of chloro and bromo;

$n$ is a number from 1.5 to 2; and $m$ is a number from 1.2 to 2.

2. Dyestuff of the formula

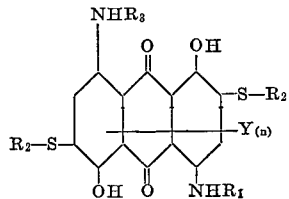

wherein $R_1$ is a member selected from the group consisting of lower alkyl, cyano(lower)alkyl, hydroxy(lower)alkyl, lower alkoxycarbonyl, lower alkylaminocarbonyl and dimethylaminopropylaminocarbonyl;

$R_2$ is a member selected from the group consisting of lower alkyl, cyano(lower)alkyl, hydroxy(lower)alkyl, lower alkoxy(lower)alkyl, lower alkoxycarbonyl(lower)alkyl and lower alkylaminocarbonyl(lower)alkyl;

$R_3$ is a member selected from the group consisting of a hydrogen atom and $R_1$;

Y is a member selected from the group consisting of chloro and bromo; and $n$ is a number from 1.5 to 2.

3. In the dyeing or printing organic synthetic or regenerated fibers of hydrophobic character or textile materials made of these fibers with an anthraquinone dye, the improvement wherein the anthraquinone dye is a dye according to claim 1.

4. The mixture of compounds according to claim 1, obtained by bromination of 1,5-dihydroxy-2,6-di-(2'-hydroxyethylmercapto) - 4 - amino - 8 - methylaminoanthraquinone and 1,5-dihydroxy-2,6-di-(2'-hydroxyethylmercapto)-4,8-di-(methylamino)-anthraquinone.

5. The mixture of compounds according to claim 1, obtained by bromination of 1,8-dihydroxy-2,7-di-(2'-hydroxyethylmercapto) - 4 - amino - 5 - methylaminoanthraquinone and 1,8-dihydroxy-2,7-di-(2'-hydroxyethylmercapto)-4,5-di-(methylamino)-anthraquinone.

6. The mixture of compounds according to claim 1, obtained by chlorination of 1,5-dihydroxy-2,6-di-(2'-hydroxyethylmercapto) - 4,8 - di - (methylamino)-anthraquinone and 1,5 - dihydroxy-2,6-di-(2'-hydroxyethylmercapto)-4-amino-8-methylaminoanthraquinone.

7. The mixture of compounds according to claim 1, obtained by chlorination of 1,8-dihydroxy-2,7-di-(2'-hydroxyethylmercapto) - 4 - amino - 5 - methylaminoanthraquinone and 1,8-dihydroxy-2,7-di-(2'-hydroxyethylmercapto)-4,5-di-(methylamino)-anthraquinone.

8. Fibers or textile materials dyed or printed with dye according to claim 1.

References Cited

FOREIGN PATENTS

| | | |
|---|---|---|
| 627,092 | 7/1963 | Belgium. |
| 1,317,459 | 1/1963 | France. |
| 1,396,118 | 3/1965 | France. |

DONALD LEVY, Primary Examiner

U.S. Cl. X.R.

8—39, 40, 176; 260—381